US011360986B2

(12) United States Patent
Raczko et al.

(10) Patent No.: US 11,360,986 B2
(45) Date of Patent: Jun. 14, 2022

(54) ENTERPRISE SEARCH

(71) Applicant: MicroStrategy Incorporated, Vienna, VA (US)

(72) Inventors: Cezary Raczko, Ashburn, VA (US); Siamak Ziraknejad, Reston, VA (US)

(73) Assignee: MicroStrategy Incorporated, Vienna, VA (US)

( * ) Notice: Subject to any disclaimer, the term of this patent is extended or adjusted under 35 U.S.C. 154(b) by 113 days.

(21) Appl. No.: 16/741,168

(22) Filed: Jan. 13, 2020

(65) Prior Publication Data
US 2020/0151185 A1    May 14, 2020

Related U.S. Application Data

(63) Continuation of application No. 15/427,660, filed on Feb. 8, 2017, now Pat. No. 10,534,783.

(60) Provisional application No. 62/292,775, filed on Feb. 8, 2016.

(51) Int. Cl.
*G06F 16/2457* (2019.01)
*G06F 16/248* (2019.01)
*G06F 16/9535* (2019.01)
*G06F 3/04842* (2022.01)
*G06F 3/0482* (2013.01)

(52) U.S. Cl.
CPC ...... *G06F 16/24578* (2019.01); *G06F 16/248* (2019.01); *G06F 16/9535* (2019.01); *G06F 3/0482* (2013.01); *G06F 3/04842* (2013.01)

(58) Field of Classification Search
None
See application file for complete search history.

(56) References Cited

U.S. PATENT DOCUMENTS

| 5,875,446 | A  | 2/1999  | Brown et al. |
| 5,924,090 | A  | 7/1999  | Krellenstein |
| 5,940,821 | A  | 8/1999  | Wical |
| 6,026,388 | A  | 2/2000  | Liddy et al. |
| 6,385,602 | B1 | 5/2002  | Tso et al. |
| 6,539,373 | B1 | 3/2003  | Guha |
| 6,542,889 | B1 | 4/2003  | Aggarwal et al. |
| 6,654,749 | B1 | 11/2003 | Nashed |
| 6,785,671 | B1 | 8/2004  | Bailey |

(Continued)

FOREIGN PATENT DOCUMENTS

| WO | WO98/12881 | 3/1998 |
| WO | WO01/46870 | 6/2001 |

OTHER PUBLICATIONS

AI Publications Co. ltd. "IT Information Search Techniques using the Internet, Search Engine Application Guide", Japan, May 28, 2000, pp. 63-77. (Includes English abstract).

(Continued)

*Primary Examiner* — Kim T Nguyen
(74) *Attorney, Agent, or Firm* — Fish & Richardson P.C.

(57) ABSTRACT

In some implementations, one or more computers receive a search query input. One or more search results identified based on the search query input are provided. Data indicating interaction of the user with a particular search result from the one or more search results is received. In response to receiving the data indicating the interacting, a filter determined based on the particular search result is applied to a set of search results identified in response to a subsequent search query input.

20 Claims, 7 Drawing Sheets

(56) References Cited

U.S. PATENT DOCUMENTS

| | | |
|---|---|---|
| 6,842,761 B2 | 1/2005 | Diamond et al. |
| 6,961,731 B2 | 11/2005 | Holbrook |
| 6,963,867 B2 | 11/2005 | Ford et al. |
| 7,031,961 B2 | 4/2006 | Pitkow et al. |
| 7,206,780 B2 | 4/2007 | Slackman |
| 7,249,058 B2 | 7/2007 | Kim et al. |
| 7,447,678 B2 | 11/2008 | Taylor |
| 7,627,826 B2 | 12/2009 | Pry |
| 7,644,373 B2 | 1/2010 | Jing et al. |
| 7,809,703 B2 | 10/2010 | Balabhadrapatruni et al. |
| 7,836,044 B2 | 11/2010 | Kamvar et al. |
| 7,895,177 B2 | 2/2011 | Wu |
| 8,135,669 B2 | 3/2012 | Olstad et al. |
| 8,301,656 B2 | 10/2012 | Taylor et al. |
| 9,058,389 B2 | 6/2015 | Taylor et al. |
| 9,342,563 B2 | 5/2016 | Taylor et al. |
| 9,483,524 B1 * | 11/2016 | Horling ............. G06F 16/245 |
| 9,940,387 B2 * | 4/2018 | Holt ................. G06F 16/3322 |
| 2002/0078045 A1 | 6/2002 | Dutta |
| 2002/0152222 A1 | 10/2002 | Holbrook |
| 2003/0037050 A1 | 2/2003 | Monteverde |
| 2003/0046161 A1 | 3/2003 | Kamangar et al. |
| 2003/0164862 A1 | 9/2003 | Cadiz et al. |
| 2003/0195877 A1 | 10/2003 | Ford et al. |
| 2004/0003352 A1 | 1/2004 | Bargeron et al. |
| 2005/0004889 A1 | 1/2005 | Bailey et al. |
| 2006/0106793 A1 | 5/2006 | Liang |
| 2006/0265417 A1 | 11/2006 | Amato et al. |
| 2007/0174790 A1 | 7/2007 | Jing et al. |
| 2008/0276185 A1 | 11/2008 | Pry |
| 2011/0093488 A1 | 4/2011 | Amacker et al. |
| 2013/0275164 A1 * | 10/2013 | Gruber ................. G10L 15/22 705/5 |
| 2014/0129540 A1 * | 5/2014 | Riley ................. G06F 3/0481 707/E17.108 |
| 2014/0365481 A1 | 12/2014 | Novosel |
| 2015/0006564 A1 * | 1/2015 | Tomkins ............. G06F 16/9535 707/767 |
| 2016/0092598 A1 * | 3/2016 | Mishra ............. G06F 16/90328 707/740 |
| 2016/0232239 A1 | 8/2016 | Taylor et al. |
| 2017/0185679 A1 * | 6/2017 | Anand ............. G06F 16/9535 |
| 2017/0185869 A1 * | 6/2017 | Dua ................. G06V 10/42 |
| 2018/0246977 A1 * | 8/2018 | Riley ................. G06F 16/9535 |

OTHER PUBLICATIONS

Goldberg et al., "Metasearch engines and Information Retrieval: Computational complexity of ranking multiple search results", Queens College, Department of Computer Science, 2008, pp. 315-320.

* cited by examiner

ENTERPRISE SEARCH

CROSS-REFERENCE TO RELATED APPLICATIONS

This application is a continuation of U.S. application Ser. No. 15/427,660, filed Feb. 8, 2017, now allowed, which claims the benefit of U.S. Application Ser. No. 62/292,775, filed on Feb. 8, 2016. Both of these prior applications are incorporated by reference in their entirety.

FIELD

This specification generally relates to search technology.

BACKGROUND

As the volume of data utilized by user devices and across an enterprise increases, improved methods for searching across multiple platforms and devices are desired for providing relevant results to users.

SUMMARY

In some implementations, search functionality allows users to search for resources across multiple platforms in an enterprise system. A search input field may be provided through a graphical user interface, which provides a user with the ability to interact with and search for a variety of resources across multiple platforms in an enterprise system. The characters of search queries can be transmitted to a search server, in real-time, as the user types the query. The search server may determine, in real-time, how many characters are input into the search input field and provide search results for a partial query if the number of characters satisfies a threshold. As another example, the search server can assess the set of search results for the partial query and determine which results to provide, how to organize the results, and when to provide the results based on analysis of the search results. The search server may also provide suggestions for search terms, for example, query suggestions or query auto-completions. The search server may provide search results that include alphanumeric or graphical representations of resources in the enterprise system that have content or metadata that match the characters input into the search input field.

In some implementations, the search server receives one or more signals that provides additional information regarding categories and resources in the enterprise system that have content or metadata that match the characters input into the search input field. The additional information may include, for example, information indicating that a topic or resource is likely to be of interest to the user, or information indicating that a resource or category has been previously accessed by the user. The resources and categories are filtered and ranked according to the one or more signals and subsequently provided in a search result listing to a user device for presenting to the user.

In some implementations, the search system combines local search operations performed at a user's device with search operations performed by a remote search server. For example, when a user enters a query, the user's device may perform a search of locally cached or recently accessed data, while the search server searches a larger remote database in parallel. The two concurrent search processes can both be executed for partial queries (e.g., before a user submits or indicates completion of a query) or for complete queries.

Often, the local search process operates locally, uses a smaller corpus of data than the remote server uses, and is not affected load constraints of a server which may support many users. These factors may permit the local search process to provide results more quickly than the remote server in some instances. Further, because the local search process has access to the data recently accessed at the device, the results are selected from a data set that is likely to be of relevance to the user, since the user previously accessed the data. The remote server can provide more comprehensive results, using a much wider variety of data sources and indexes. The results of local and remote search operations may be displayed in separate result areas, which may be updated asynchronously or independently as additional results are identified. As another example, the results of the local and remote search operations may be combined or merged. For example, results of the same type or category may be shown as a single combined set. As another example, the device and server may cooperate, e.g., with the user device identifying a resource of interest based on the cached data, and the search server then providing a link to access a more recent version of the resource.

The search system server may process a search query once a character threshold has been satisfied. For example, the search system server may execute a search once at least two characters have been entered. The character threshold can be determined by an administrator of the search system server, by a user, etc. By not immediately executing a search, the search system server conserves processing resources by reducing the number of irrelevant search results returned in response to a broader search query.

In some implementations, the search results provided are grouped into categories and formatted according to the categories. As an example, one group may include locally identified results, while another group indicates remotely identified results. Different groups may be presented for results of a different resource types (e.g., application, data source, document, specific file type, etc.). Results may be grouped according to whether a match occurs in the content of a document or the metadata. Matches in different metadata fields (e.g., author field, reviewer field, date stamp field, object name, etc.) can be grouped together, as can matches in different portions of a resource (e.g., document body, title, overview section, page element, an element within a page, etc.) Indeed, different components of a document, application, database, or other resource may be considered different search results. For example, if a database includes a query term, different search results can be identified for the database itself, a specific table containing the term, as well as a specific record or field within the table. Each of these results may be grouped into a respective group with results of a similar type (e.g., with different database results grouped together, different table results grouped together, different record or field results grouped together.) In some implementations, the search results are grouped according to predetermined categories, and the search system determines whether to present data indicating a category based on the number, relevance, and quality of results obtained in that category. The device performing a search may determine to show a category in a set of results if, for example, a relevance score for one or more results satisfies a threshold, or a number of results in the category satisfies a threshold. Similarly, categories used for grouping can be determined dynamically, for example, by clustering identified results according to their characteristics, or by splitting or merging categories based on user preferences or characteristics of the search result set.

The search system server may rank search results based on data indicating clusters of users. In some implementations, the search system server creates clusters of users and later uses the generated clusters to identify and/or rank search results. Each cluster of users may include users with similar characteristics or behavior, and may be determined based on various factors, including document access patterns. Document access patterns can indicate how frequently users access particular documents or documents of a particular type, the type of content accessed (e.g., topics of content, or types of content such as charts, graphs, maps, etc.), queries submitted, and other document information. Document access patterns may also indicate the method of access of documents. For example, document access data may include an indication of how often a user accesses documents directly from their desktop versus searching for the document and selecting the appropriate search result. Users that are determined to have similar document access patterns (e.g., users that submit queries with some of the same keywords and/or view or otherwise access documents having common topics or other characteristics), can be assigned to the same cluster. The documents that are viewed, created, or otherwise associated with users in the cluster can be prioritized as search results for searches by other users in the cluster.

The search system server may identify a cluster that includes the current user when executing a search query, and may rank results returned for the search query based on document access data of the users within the identified cluster. For example, if the current user belongs to a cluster of users within the accounting department of the enterprise and many of the users in the accounting department have recently accessed a spreadsheet titled "January Expenditures," the search system server may rank the spreadsheet first when the current user enters "Janus," and before the user finishes typing.

As discussed further below, the search system can provide search capabilities for an organization, such as a company, and so permits the user to search over a data set that may be specific to that organization. For example, an enterprise search feature may enable users to search for documents, applications, and other types of data that are internal to the organization. In addition, each user in the organization may have a user identity. The user identity, and its relationships with other user identities in the organization, can be used to provide more relevant search results. For example, the system enables users to select a user or group of users and filter search results to the results related to the selected user or users. For example, a user may apply a filter to limit results to those viewed by a particular user, created by a particular user, edited by a particular user, shared by a particular user, or otherwise related to a particular user. Similarly, relationships among users in the organization can be used to automatically select or rank search results. For example, documents accessed by other members of a user's department may be prioritized with a boost in ranking.

As another example, the system can identify user devices, such as mobile phones, of other users that are physically located near the user at the time the user is performing a search. Documents that were recently accessed by those nearby users can be identified and given a boost in ranking based on the proximity of the nearby users. Thus, the results of a search may vary based on whether other users in the organization are nearby, and which users are nearby. This can be helpful, for example, to indicate to participants in a meeting documents that may be relevant to the meeting based on the identities of the other participants in the room. In this manner, the selection and ranking of search results to provide to a user can vary based on the geographical proximity of other users in the organization, and the document access patterns of those users.

In some implementations, the search system provides an efficient mechanism for applying a filter to search results. For example, a search query input field can receive text of a query. The search system server can provide results of multiple categories, such as users in the organization, documents, or applications. The user interface gives the user the option to select one of the search results to, e.g., to view a user profile, to open a document, or to open an application. The user interface also gives the user the option to select a search result to apply it as a filter for further searching. For example, a tap or left click interaction with a search result may cause the result to be viewed, while a swipe or right click interaction with the search result may cause it to be applied as a filter for further searching.

For example, a filter applied from a search result representing a particular user may allow the searching user to filter results to those that the particular user performed a particular action with, e.g., created, viewed, edited, shared, annotated, rated, etc. A filter applied from a search result representing a particular application may allow the searching user to filter results to those that the application is related to, e.g., users that use or manage the particular application, documents accessed with the particular application, etc. Once a filter is applied, the user may enter a second query where results for the second query satisfy the applied filter criteria. Any of the search results may in turn be viewed or be used to define a further filter restriction. For example, from a search result for user "Tim" and a search result for application "Email" the user may apply a filter to show email documents sent by the user "Tim." Notably, because the search result for the user "Tim" corresponds to a particular user identity in the organization, and not merely the text of the user's name, the filter can filter out other users with the same or similar name. For example, in some implementations, the system can identify the email address for the user "Tim," which is linked to his user profile, and provide emails sent from that email address, instead of merely performing a text search for the name "Tim." In this manner, from a single query input field and by interacting with results, a user can apply one or more filters without requiring any toolbars, sidebars, or other filter controls.

In some implementations, the search result interface organizes search results in multiple related or hierarchical levels. For example, a search server may provide a set of search results organized into a number of groups. Each group may be represented by a graphic, a name or other identifier for the group, an indication of the number of results in the group, or information (e.g., a name, title, quote, etc.) from one or more results in the group. One or more results from the group may also be listed. In response to a user selection of one of the groups, the interface may be adjusted to show more specific sub-groups associated with the selected group. For example, if a selected group of results represents users, a list may be provided indicating users that match or are otherwise indicated to be relevant to the query. Based on the user selection, the system can infer that the query represents a user name (e.g., rather than a file name, an application name, etc.). Thus, in addition to or as an alternative to providing a user list, other subgroups that semantically interpret the query as a user name may be indicated. For example, based on access log information and metadata, they system may indicate separate sub-groups that respectively indicate resources authored, reviewed, accessed, or annotated by the user(s). If the user selects one of the users in the user list, the sub-groups may be refined to show only resources authored, reviewed, accessed, or annotated by the selected user.

The search system server can rank search results after filters have been applied to the results. In some implementations, the search system server ranks filtered search results by allocating a weight to each of multiple search signals. For example, the search system server can apply various weights to each search signal and determine a cumulative score for each search result based on the applied weights. The weights may be determined based on parameters such as how recently a search result object or resource has been accessed, which users are associated with the search result, which departments of an enterprise have accessed the search result object or resource, etc.

Search results may be organized in multiple levels groups (e.g., a hierarchy of categories). The first-level groups or categories may each represent a different content type (e.g., applications, documents, or users). The sub-groups corresponding to a first-level group may be limited to subsets of the results in the first-level group. For example, a subgroup may filter or further restrict the items in the first-level group. However, sub-groups may also indicate results associated with the group that are outside the first-level group. In the example discussed above, the first selected group represents "users," but the sub-groups indicate different groups of "documents" that have certain relationship to a user. In this manner, a sub-group is a set of related results that relies on a particular interpretation of the query suggested by the first-level group, but is not restricted to including only the results in the first-level group and is not restricted to the result type (e.g., user result) corresponding to the first-level group.

In some implementations, one aspect of the subject matter described in this specification may include a computer-implemented method including operations of receiving, by the one or more computers, one or more characters of a search query input at a user device of a user that is a member of an organization, and identifying, by the one or more computers, one or more resources having metadata or content that includes the one or more characters. For each identified resource, the method includes determining, by the one or more computers, a category to which the identified resource belongs, receiving, by the one or more computers, resource access data indicating resource access patterns of users in the organization, ranking, by the one or more computers, the one or more resources based on the resource access data, and providing, from the one or more computers to the user device, search result data for display that indicates the ranked one or more resources.

In some implementations, operations further include ranking, by the one or more computers, the determined categories of the identified one or more resources based on at least one of: context of a user interface through which the search query input is provided, a predetermined order of the categories, or the contents of the search result data, where the search result data further indicates the ranked categories. The operations may include accessing data indicating one or more clusters of users, where each cluster is determined based on document access patterns of the users, identifying a cluster that (i) includes the user of the user device, and (ii) includes two or more users, and ranking the one or more resources based on data indicating accesses to the identified resources by the two or more users in the identified cluster.

In some implementations, the search query input includes one or more search signals that indicate one or more of: data indicative of a user search history of queries that include the entered characters, data indicative of a search query that includes the entered characters and has the highest query submission frequency amongst users of an enterprise system, data indicative of users proximal to the user of the user device, data indicative of access data of a resource, data indicative of prior selections of the search result data, data indicative of a category in the enterprise system selected by the user, and data indicative of a likely subject matter of interest based on a pattern of the user behavior.

In some implementations, the access data indicates user accesses of resources for users that are similar to the user. In some implementations, the operations further include filtering the identified one or more resources and the determined categories based on the one or more search signals, and providing, by the one or more computers and for display at the user device, the search result data before the user signals completion of the search query input.

In some implementations, the operations further include storing the data indicative of the selection of the one of the ranked one or more resources and categories in a cache storage on the client device, identifying one or more second resources having metadata or content that include the one or more characters of the second search query, for each identified second resource, determining a second category to which the identified second resource belongs, receiving one or more second search classification signals, filtering the identified one or more second resources and the determined second categories based on the one or more second search classification signals and the category to which the identified resource belongs, ranking, by the one or more processors, the filtered one or more second resources and second categories based on the one or more second search classification signals, and providing, from the one or more processors to the user device, search result data for displaying the ranked one or more second resources and second categories.

In some implementations, the operations further include receiving, by the one or more processors from the user device, data indicative of a selection of one of the ranked one or more resources, receiving, by the one or more processors from the user device, one or more characters in a second search query input at the user device, and setting, by the one or more processors, a filter based on the selected one or more resources for obtaining search results in response to receiving the one or more characters in the second search query.

In some implementations, ranking, by the one or more processors, the filtered one or more resources and categories based on the one or more search classification signals includes ranking resources based on whether the resources were identified using data from a user cache, ranking resources based on whether the resources were previously accessed by the user according to user search history, and determining that a category selected by the user in a user interface is likely to be of interest to the user and ranking resources based on determining whether the resources are within the category selected by the user.

In some implementations, another aspect of the subject matter described in this specification may include a computer-readable storage medium storing instructions executable by one or more computers which, upon such execution, cause the one or more computers to perform operations. These operations include receiving, by the one or more computers, one or more characters of a search query input at a user device of a user that is a member of an organization, identifying, by the one or more computers, one or more resources having metadata or content that includes the one or more characters, for each identified resource, determining, by the one or more computers, a category to which the identified resource belongs, receiving, by the one or more computers, resource access data indicating resource access patterns of users in the organization, ranking, by the one or more computers, the one or more resources based on the resource access data, and providing, from the one or more computers to the user device, search result data for display that indicates the ranked one or more resources.

In some implementations, the operations further include ranking, by the one or more computers, the determined categories of the identified one or more resources based on at least one of: context of a user interface through which the search query input is provided, a predetermined order of the categories, or the contents of the search result data, where the search result data further indicates the ranked categories.

In some implementations, the operations further include accessing data indicating one or more clusters of users, where each cluster is determined based on document access patterns of the users, identifying a cluster that (i) includes the user of the user device, and (ii) includes two or more users, and ranking the one or more resources based on data indicating accesses to the identified resources by the two or more users in the identified cluster.

In some implementations, the operations further include filtering the identified one or more resources and the determined categories based on the one or more search signals, and providing, by the one or more computers and for display at the user device, the search result data before the user signals completion of the search query input.

In some implementations, the operations further include receiving, by the one or more processors from the user device, data indicative of a selection of one of the ranked one or more resources, receiving, by the one or more processors from the user device, one or more characters in a second search query input at the user device, and setting, by the one or more processors, a filter based on the selected one or more resources for obtaining search results in response to receiving the one or more characters in the second search query.

In some implementations, one aspect of the subject matter described in this specification may include s system that includes one or more computers and one or more storage devices storing instructions that upon execution by the one or more computers, cause the one or more computers to perform operations. The operations include receiving, by the one or more computers, one or more characters of a search query input at a user device of a user that is a member of an organization, identifying, by the one or more computers, one or more resources having metadata or content that includes the one or more characters, for each identified resource, determining, by the one or more computers, a category to which the identified resource belongs, receiving, by the one or more computers, resource access data indicating resource access patterns of users in the organization, ranking, by the one or more computers, the one or more resources based on the resource access data, and providing, from the one or more computers to the user device, search result data for display that indicates the ranked one or more resources.

In some implementations, the operations further include ranking, by the one or more computers, the determined categories of the identified one or more resources based on at least one of: context of a user interface through which the search query input is provided, a predetermined order of the categories, or the contents of the search result data, where the search result data further indicates the ranked categories.

In some implementations, the operations further include accessing data indicating one or more clusters of users, where each cluster is determined based on document access patterns of the users, identifying a cluster that (i) includes the user of the user device, and (ii) includes two or more users, and ranking the one or more resources based on data indicating accesses to the identified resources by the two or more users in the identified cluster.

In some implementations, the operations further include filtering the identified one or more resources and the determined categories based on the one or more search signals, and providing, by the one or more computers and for display at the user device, the search result data before the user signals completion of the search query input.

In some implementations, the operations further include receiving, by the one or more processors from the user device, data indicative of a selection of one of the ranked one or more resources, receiving, by the one or more processors from the user device, one or more characters in a second search query input at the user device, and setting, by the one or more processors, a filter based on the selected one or more resources for obtaining search results in response to receiving the one or more characters in the second search query.

In some implementations, ranking, by the one or more processors, the filtered one or more resources and categories based on the one or more search classification signals includes one or more of: ranking resources based on whether the resources were identified using data from a user cache, ranking resources based on whether the resources were previously accessed by the user according to user search history, and determining that a category selected by the user in a user interface is likely to be of interest to the user and ranking resources based on determining whether the resources are within the category selected by the user.

In some implementations, another aspect of the subject matter described in this specification may include a computer-implemented method including operations of receiving, by one or more processors, one or more characters of a search query input at a user device and identifying one or more resources having metadata or content that include the one or more characters. For each identified resource, a category to which the identified resource belongs is determined. The operations further include receiving one or more search classification signals, filtering the identified one or more resources and the determined categories based on the one or more search classification signals, ranking, by the one or more processors, the filtered one or more resources and categories based on the one or more search classification signals, and providing, from the one or more processors to the user device, search result data for displaying the ranked one or more resources and categories.

In some implementations, the operations further include determining that a number of the one or more characters of the search query satisfies a character threshold, and, in response to the number of the one or more characters of the search query satisfying the character threshold, performing the identifying of the one or more resources having metadata or content that include the one or more characters.

In some implementations, the one or more search signals include one or more of: data indicative of one or more filters configured to filter the one or more resources; data indicative of a user search history of queries that include the entered characters; data indicative of a search query that includes the entered characters and has the highest query submission frequency amongst users of an enterprise system; data indicative of a category in the enterprise system selected by the user; and data indicative of a likely subject matter of interest based on a pattern of the user behavior.

In some implementations, the operations further include receiving, by the one or more processors from the user device, data indicative of a selection of one of the ranked one or more resources and categories, receiving, by the one or more processors from the user device, one or more characters in a second search query input at the user device, and setting the one of the ranked one or more resources and categories as a filter for obtaining search results in response to receiving the one or more characters in the second search query.

In some implementations, the operations further include storing the data indicative of the selection of the one of the ranked one or more resources and categories in a cache storage, identifying one or more second resources having metadata or content that include the one or more characters of the second search query, and for each identified second resource, determining a second category to which the identified second resource belongs, the identified second resource being nested within the second category and the category to which the identified resource belongs. The operations further include receiving one or more second search classification signals, filtering the identified one or more second resources and the determined second categories based on the one or more second search classification signals and the category to which the identified resource belongs, ranking, by the one or more processors, the filtered one or more second resources and second categories based on the one or more second search classification signals, and providing, from the one or more processors to the user device, search result data for displaying the ranked one or more second resources and second categories.

In some implementations, the ranking, by the one or more processors, the filtered one or more resources and categories based on the one or more search classification signals includes one or more of: ranking resources provided by user cache at a higher ranking relative a ranking of resources not provided by the user cache; ranking resources previously accessed by the user according to user search history at a higher ranking relative a ranking of resources not previously accessed by the user; and determining that a category selected by the user in a user interface is likely to be of interest to the user and ranking resources within the category selected by the user at a higher ranking relative to resources that belong to one or more categories not selected by the user.

In some implementations, the ranking, by the one or more processors, the filtered one or more resources and categories based on the one or more search classification signals includes allocating a weight to each of the one or more search classification signals, and determining a ranking of the filtered one or more resources and categories by determining a cumulative score based on the allocated weights to each of the one or more search classification signals.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

Like reference numbers and designations in the various drawings indicate like elements.

DETAILED DESCRIPTION

Figure 1:
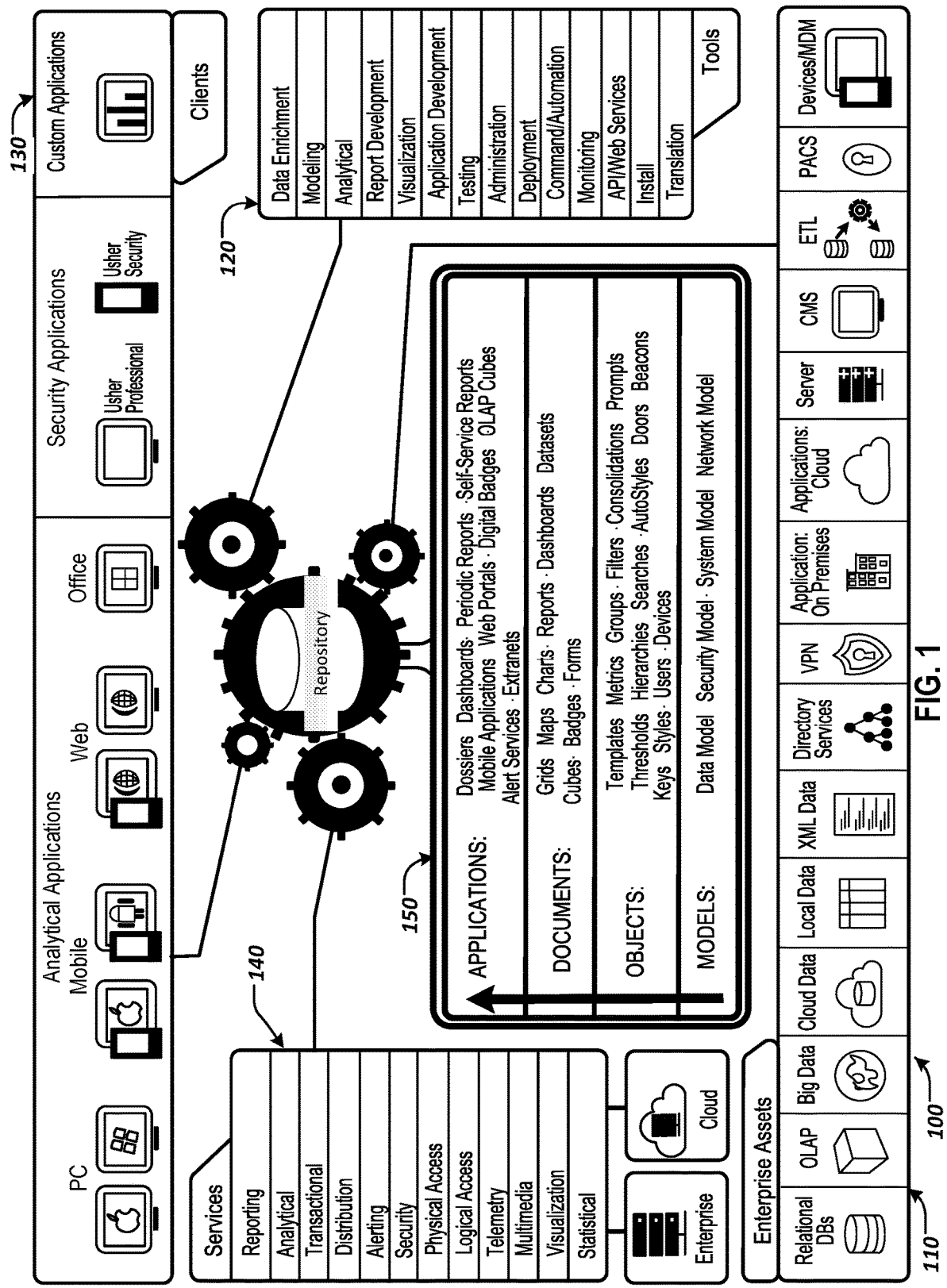
FIG. 1 is an illustration of an example of a unified, multi-platform enterprise system.

Referring to FIG. 1, a multi-platform system 100 across an enterprise is illustrated. In general, an enterprise may include various systems, components, platforms, and configurations. As shown in FIG. 1, the various platforms may include, for example, one or more of enterprise assets 110, tools 120, a client system 130, services 140, and a repository including resource 150.

In some implementations, the client system 130 may include, but is not limited to, one or more of security applications, device analytic applications, and various other custom applications. The device applications may be applications used on devices provided by the enterprise. These devices may include any suitable electronic device such as, for example, a personal computer, a laptop, a mobile telephone, a smart phone, a personal digital assistant, an electronic pad, a smart watch, a smart TV, a mobile audio or video player, a game console, smart glasses, or a combination of one or more of these devices.

In some implementations, the services 140 may include, but are not limited to, one or more of reporting services, analytical services, transactional services, distribution services, alerting services, security services, physical access services, logical access services, telemetry services, multimedia services, visualization services, and statistical services. These services may be provided through enterprise systems or through an Internet-based cloud system.

In some implementations, the tools 120 may include, but are not limited to, one or more of a data enrichment tool, a modeling tool, an analytical tool, a report development tool, a visualization tool, an application development tool, a testing tool, an administration tool, a deployment tool, a command/automation tool, a monitoring tool, an API/web services tool, an install tool, and a translation tool.

In some implementations, the enterprise assets 110 may include, but are not limited to, one or more of relational databases, an online analytical processing (OLAP) service, a cloud database, a local database, an XML database, big data services and databases, directory services, virtual private network (VPN) services, on-premises applications, cloud applications, one or more devices, one or more servers, content management systems (CMS), picture archiving and communication services (PACS), and Extract, Transform, and Label services.

In some implementations, the repository is a storage database that may store various data including one or more of resources 150 including applications, documents, objects, and models. The applications may include, for example, dossier applications, dashboard applications, periodic report applications, self-service report applications, mobile applications, web portals, digital badge applications, OLAP cube applications, alert service applications, and extranet applications. The documents may include, for example, grids, maps, charts, reports, dashboards, datasets, cubes, badges, forms, and credentials. The objects may include, for example, template objects, metric objects, group objects, filter objects, consolidation objects, prompt-related objects, threshold objects, hierarchy objects, search objects, autostyle objects, door-related objects, beacon objects, key objects, style objects, user indicators, and device-indicating objects. The models may include, for example, a data model, a security model, a system model, and a network model.

The client systems 130, services 140, tools 120, enterprise assets 110, and repository, including resources 150, platforms are connected through one or more networks and, combined, provide a unified system for enterprise analytics, mobility, and security. The unified enterprise system may provide access to a large volume of data for a large number of devices. Access to the unified enterprise system may be provided through a graphical user interface (GUI). This GUI may be provided as part of a native application, a web application, a web page, or in another format. However, searching for data across the unified system may, in some cases, be challenging if different resource types, domains, and systems must be searched with separate search functionality. For instance, the user may not know where to look for particular data amongst the various interfaces provided in the unified, multi-platform enterprise system. To address this challenge, an efficient system to index data across the various platforms, to search for data across the various platforms, and to interact with the various platforms can be implemented. Implementations of such an efficient system are described in further detail with reference to FIGS. 2-5.

Figure 2:
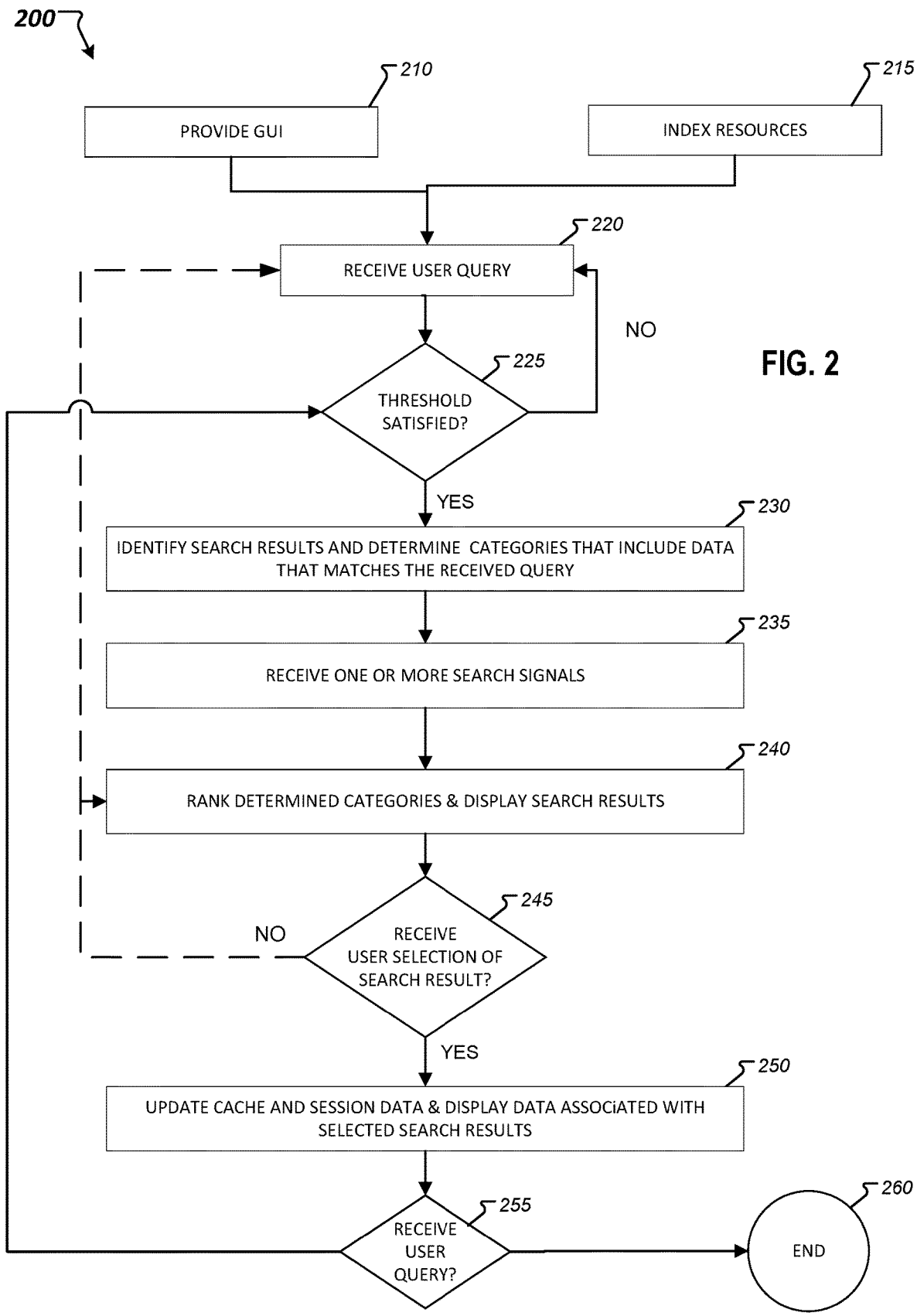
FIG. 2 is a flowchart illustrating a method for handling and performing a search in the unified, multi-platform enterprise system.

FIG. 2 illustrates a method for handling and performing a universal search in the unified, multi-platform enterprise system 100. The method may be executed by one or more processors in a search system server, as described in further detail in FIG. 5.

As a preliminary matter, the search system server may configure a workstation GUI that allows a user to access data amongst the various platforms in the unified, multi-platform enterprise system. Data for generating and displaying the workstation GUI may be transmitted to a user's enterprise device so that the user enterprise device can display the workstation GUI to a user (210). The user may be able to receive information and provide inputs through the workstation GUI.

Figure 3:
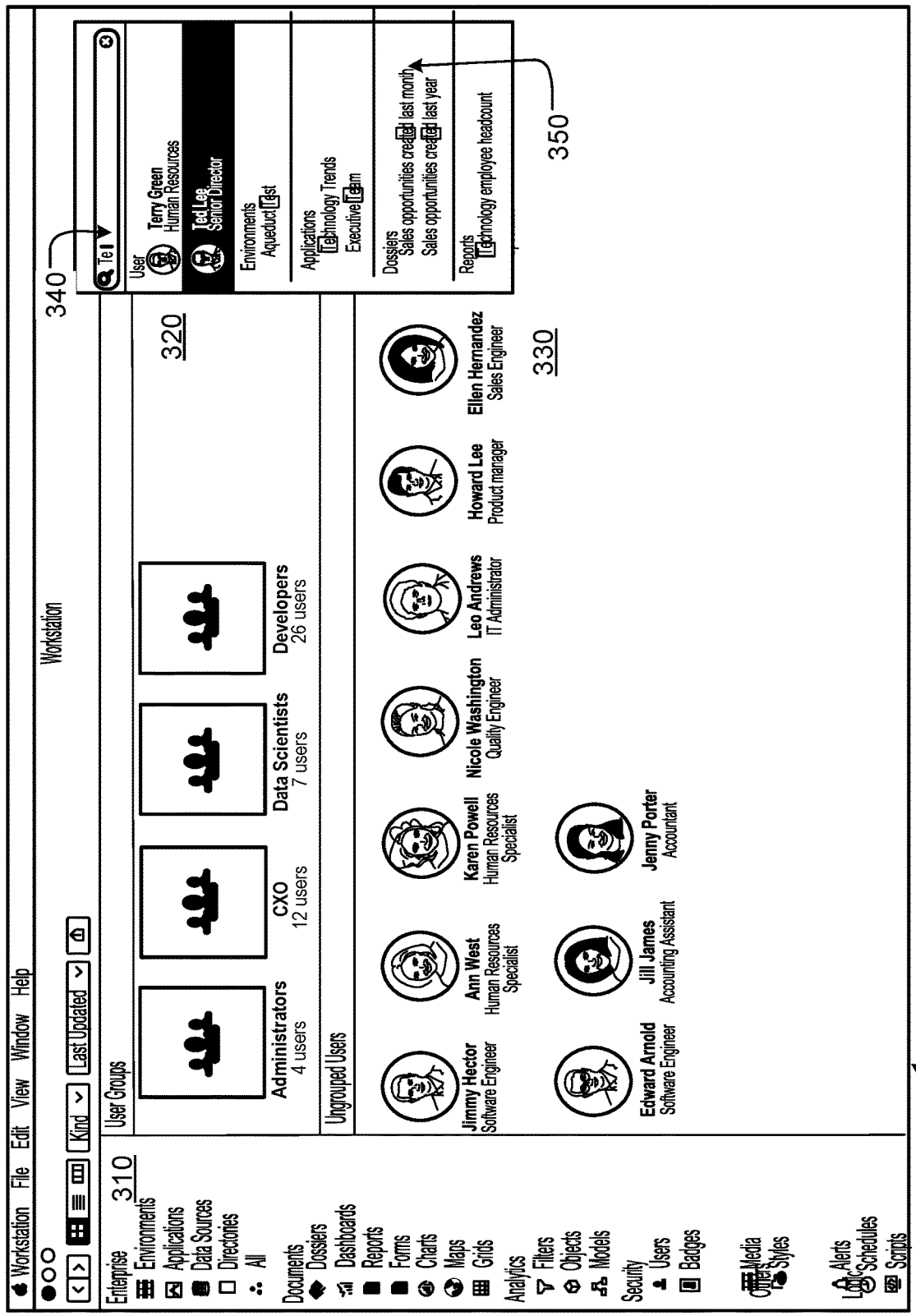
FIGS. 3, 3A, 4, and 4A are an exemplary illustrations of graphical user interfaces for enterprise searching.

For example, FIG. 3 illustrates an exemplary implementation of a GUI 300. The GUI 300 may be divided into one or more portions 310, 320, 330, and 340. In one portion, for example in categories portion 310, a list of categories corresponding to the various platforms in the unified, multi-platform enterprise system 100 is displayed. Within each category, a list of objects, documents, and other data types can also be provided. For example, within the "Documents" category, various types of documents such as "Dossiers," "Dashboards," "Reports," "Forms," "Charts," "Maps," and "Grids" are listed. In the Enterprise category, subcategories "Environments," "Applications," "Data Sources," "Directories," and "All" are listed. In the "Analytics" category, "Filters," "Objects," and "Models" are the subcategories listed. In the "Security" category, "Users" and "Badges" are the sub-categories listed. In the "Others" category, "Media" and "Styles" are the sub-categories listed. In the "Logic" category, the "Alerts," "Schedules," "Scripts," and "Workflows" are the sub-categories listed. It should be understood that any suitable type of category and sub-category in the unified, multi-platform enterprise system available for access to the user may be listed in categories portion 310.

In some implementations, portions 320 and 330 of GUI 300 may display subcategories and any supplemental information associated with a category selected in portion 310. For example, in the example illustrated in FIG. 3, a "Users" category is selected from within the "Security" platform listed in portion 310. Portion 320 displays a list of the "User Groups" subcategory, and portion 330 displays a list of the "Ungrouped Users" subcategory.

One or both of alphanumeric text and graphical representations may be used to represent the different objects within each subcategory. For example, in portion 320, an icon may be used to represent a particular user group. Alphanumeric text may be used to display additional information about the particular user group, such as a group name and a number of users in the group. In another example, in portion 330, an image may be used to represent a particular ungrouped user. Alphanumeric text may be used to display additional information about the particular ungrouped user, such as a name of the ungrouped user and a position or occupational designation of the ungrouped user within the enterprise. It should be understood that each category may have various different types of subcategories, which may or may not be the same as subcategories in other categories.

Portion 340 includes interfaces with one or more tools provided by the GUI 300. The one or more tools provided by the GUI 300 may include, for example, filters, view modes, list display modes, and a search tool amongst various other types of tools. An exemplary implementation of the search tool is shown in portion 340. As discussed in further detail below, when a user selects the search tool in portion 340 and enters alphanumeric characters, a drop down interface may be displayed to illustrate search results corresponding to the entered text characters.

Referring back to FIG. 2, data for configuring and displaying a GUI 300 is provided by the search system server (210). The search system server also indexes resources available in the unified, multi-platform enterprise system (215). The resources may include, for example, applications, documents such as web pages, reports, articles, datasets, objects, models, etc. The resources may be located in various locations, such as in a user device, network device, server, or database. In some implementations, the search system server also indexes metadata respectively associated with the resources available in the unified, multi-platform enterprise system.

Indexing of the resources may be performed using any suitable tool, software, and technique. For example, in some implementations, the indexing may be using Apache Lucene. In some implementations, the search system server may receive information about the contents and metadata of resources from a web crawler, and may index the resources by storing index information. During indexing, the search server system may also receive information regarding a hierarchical structure of the data. For example, indexing may include obtaining layering data indicative of locations (e.g., a category level, a sub-category level, an environment level, an application level, or any other level) at which the resources may be located.

The indexing of resources may, in some implementations, be performed continuously, and, in some implementations, may be performed periodically (e.g., hourly, daily, etc.). Indexing is generally performed prior to receiving and processing queries from users, and is generally done independently of query processing.

After providing data for configuring the GUI (210) and indexing resources (215), the search system server may receive a user query that a user has input through search input window in portion 340 (220). In some cases, a user may have selected a category (e.g., "Users") prior to entering a search query. In some cases, the user may not select any category prior to entering the search query. A search query may be entered by the user through various suitable means. For example, the search query may be entered by input received through one or more of a touch-pad, keyboard, alphanumeric touch display, or an audio signal (e.g., voice output of the user).

As the user enters the search query, the search system server monitors the search query to determine whether the entered search query has satisfied a threshold length (225). For example, if the user uses a keyboard to select characters for input into the search field, the search system server may monitor the number of characters input by the user and compare the number of characters with a character threshold. If the number of input characters does not satisfy the character threshold, the search system server continues to monitor the received query, and, in particular, the number of characters entered by the user search query (220). If the number of input characters satisfies the character threshold, the search system server proceeds to operations 230-260.

Satisfaction of the character threshold is a means of enhancing the enterprise system efficiency. For instance, providing search results based on one input character may not provide relevant search results and may not be an optimal for enterprise system efficiency. Accordingly, if search results are provided after a character threshold is satisfied, efficiency of the search functionality may be enhanced. The character threshold may be set by an administrator of the unified, multi-platform enterprise system, and may be based on one or more criteria.

Upon satisfaction of the character threshold, the search system server may identify one or more resources, such as enterprise assets 110, tools 120, services 140, or the resources 150, that match a search query. Throughout the rest of the disclosure, resource or object may refer to any of the above identified resources as described with respect to FIG. 1. In addition to determining the matches, the search system server may determine a number and the types of categories the matches belong to (230). The search system may use various suitable techniques to identify the matches including, for example, character matching of characters in the search query to characters in various enterprise data such as tags, content, files, objects, code, and metadata in the unified, multi-platform enterprise system.

Figure 3A:
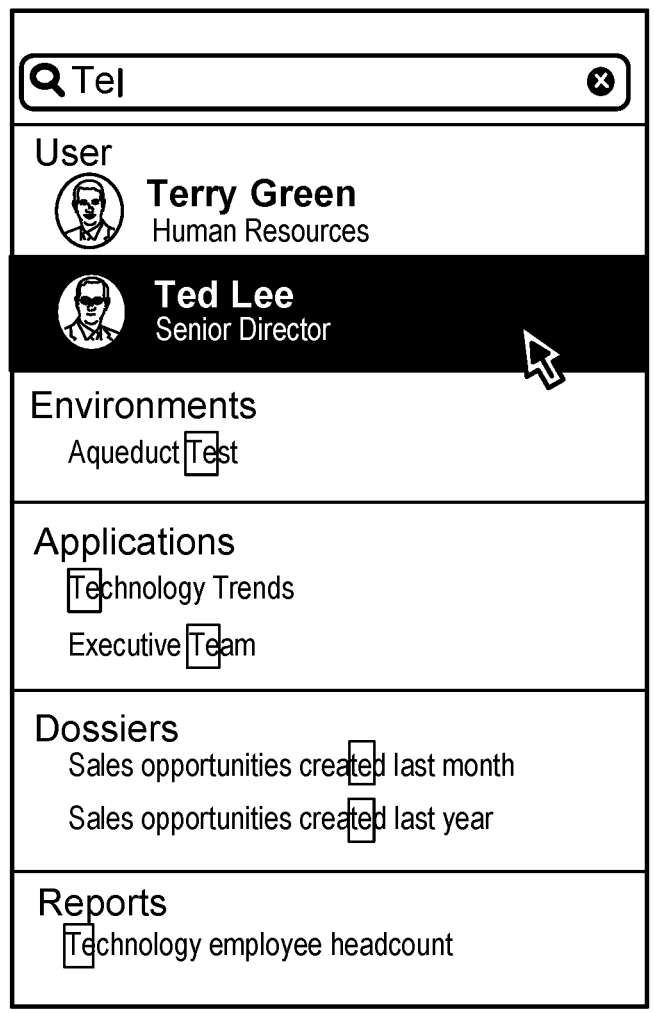

Referring to the illustrated example in FIGS. 3 and 3A, a user may enter the characters "Te" for input into the search input window. After receiving just the first character "T," the search system server determined that the character threshold was not satisfied. However, after receiving the second character "e," the search system determined that the input two characters satisfy an exemplary character threshold. The search system server then identifies one or more resources that match the search query "Te" and determines a number and the types of categories the matched resources belong to. For instance, the search system server may match "Terry Green," "Ted Lee," "Aqueduct Test," "Technology Trends," "Executive Team," "Sales opportunities created last month," "Sales opportunities created last year," "Technology employee headcount" and various other resource identifiers or metadata associated with the resource identifiers to the input search query "Te."

For each matched resource identifier, the search system server may determine the category that the matched resource belongs. For instance, the search system server may determine that two identifiers of resources, namely, "Sales opportunities created last month" and "Sales opportunities created last year" are in the "Dossiers" category. As another example, the search system server may determine that two identifiers of resources, namely, identification data of "Terry Green" and "Ted Lee" are in the "Users" category.

Referring back to FIG. 2, after determining a number and types of categories that include data matching the received query, the search system server may receive one or more search signals (235). The search signals may include various types of search signals from which data used to further process the matched data is obtained.

For instance, in some implementations, the search system server may receive a search signal from the GUI 300 indicating whether the user has selected one or more categories listed in portion 310. In the example shown in FIG. 3, the user selected the "Users" category under the "Security" platform. The search system server then receives a search signal indicative of the user's category selection.

In general, the search system server may receive various types of search signals. The search signals received by the search system server may include one or more of: data indicative of one or more search filters applied by the user; data indicative of user search history; data indicative of user search history of queries that include the entered characters; data indicative of a search query that includes the entered characters and has the highest query frequency amongst users of the unified, multi-platform enterprise system; data indicative of a search query that includes the entered characters and has the highest query frequency amongst a social network of the user or a user group of which the user is a member of; data indicative of a search query that includes the entered characters and has the highest query frequency on the Internet for a particular period of time; and data indicative of a likely subject matter of interest based on a pattern of the user behavior. The particular period of time may, in some cases, be specified by the user, or may, in some cases, be specified by an administrator of the unified, multi-platform enterprise system.

In some implementations, the search signals received by the search system server may include user cache and search session data. In some implementations, in some cases, data indicative of a likely category of interest in the user's current search session may be provided in the search signals. For example, if the user selected a search result from the "Dossiers" category for the previous three search queries, the search system server may receive a search signal from the user cache indicating that the user is likely interested in resources in the "Dossiers" category. In some cases, the search signals may include one or more of: cached data that identifies previous resources accessed by the user, cached data identifying search results previously selected by the user, cached data including metadata of resources cached in the user cache, and search queries previously entered by the user. In some cases, a subject matter that is frequently searched for by the user may be determined to be a likely subject matter of interest to the user based on the user's search history.

The search system server may execute a search for a given search query based on search signals that are separate from the query entered by the user. The search signals can include signals that indicate a user's resource access data, including a user's search history and past queries that include the currently entered characters or complete query. For example, the search signals can include logs of the user's previously entered queries that match the currently entered characters. In some implementations, the search system server can identify, from the resource access data, a search query that includes the entered characters, and has the highest rate of submission as a query among users of a particular enterprise system. For example, the search system server can identify that the search query "Quarterly Report January 2017" has been submitted as a search query the most among search queries including "Quarterly Report," and rank search results for "Quarterly Report January 2017" before search results for other previously entered queries.

The search system server can receive search signals indicating document access data. For example, the search system server can receive search signals indicating the frequency with which a particular document has been accessed, how recently the document was edited, how many users within a particular department have accessed the document, and various other characteristics. In some implementations, the search system server can prioritize documents that are recently popular, or have recently been accessed, edited, or otherwise interacted with at a high frequency. For example, if a training session for human resources (HR) employees at a particular office location of an enterprise, many HR employees may be accessing a particular map, and the search system server may determine that the particular map should be prioritized when an HR employee searches for a map.

The document access data can indicate previous search activity of a user. In some implementations, the document access data includes a log of a user's search activity. For example, the log may include the documents returned as search results and the resources that the user selected from the search results, whether the user refined their search without selecting a result, and various other activities. In some implementations, the document access data can indicate previous search activity of users similar to the user entering the search query. For example, search activity of users with similar identities to the current user may be indicated by document access data. The group of similar users may be indicated by a predetermined list, a generated cluster, an organization group, or may be dynamically determined based on the parameters of the search query.

The document access data can indicate a category within the enterprise system selected by the user. In some implementations, the selected category can be applied as a filter to narrow search results. The document access data can indicate subject matter likely to be of interest to the user submitting the search query. The subject matter likely to be of interest may be determined based on a pattern of the user's behavior, including previous search activity of the user, characteristics of the user, etc.

After receiving one or more search signals, the search system server may display search results by filtering and ranking the matched data and categories associated with the matched data based on the received one or more search signals. The filtering and ranking of the matched data and categories associated with the matched data may be performed according to a criteria formed by one or more rules. The criteria may assign different weights to different signals according to the one or more rules.

For example, in some implementations, the criteria may indicate that a category selected by the user in portion 310 of GUI 300 should be given the highest priority. Accordingly, resources in the selected category determined to match the entered characters may be allocated the highest ranking or allocated a higher weight relative to resources in non-selected categories determined to match the entered characters.

The search system server can rank search results retrieved based on the search result's relevance to a particular identity. The identity may belong to a particular user, a particular client device, a particular department, etc. The search system server can implicitly and automatically rank results based on the identity to provide a customized and seamless user experience.

In some implementations, the search system server ranks results based on a user's identity. A user's identity may be defined by objects, resources, and other data connected to the user within a user information dataset maintained by the search system server. For example, a user may be associated with a particular department and a particular building of an enterprise, a particular manager, and a particular set of documents, all of which may be used as part of the user's identity.

The search system server may rank documents associated with the user higher than other documents returned in response to the user's search query. In some instances, the search system server prioritizes or ranks results based on relationships between the user and other users. For example, documents associated with the user's department within the enterprise can be boosted in rank.

Clusters of users, determined from commonalities in document access patterns of the users, can also be used to rank results. Characteristics of a user that may be used to determine whether users are similar can include a user's department within an enterprise, a user's title, a user's role in the enterprise, a user's job responsibilities in the enterprise, a user's search habits, and a user's position within an enterprise. For example, the search system server can rank user object results (e.g., search results representing user identities) higher based on whether the user object has a same job description as the user performing the search, or based on other relationships with the user (e.g., a user's supervisor).

A user's search habits may include the number of times or a range of times that a user has entered a particular query, the times of day that a user performs searches, the types of objects that the user selects from the search results, the filters that the user selects to narrow down results, etc. For example, the search system server may determine that a user named John is similar to the current user based in part on the fact that John selects spreadsheet documents more than 60% of the time spreadsheet documents are presented in search results, and the current user selects spreadsheet documents more than 60% of the time spreadsheet documents are presented in the search results.

The search system server may rank search results based on whether a specific person is associated with the results. For example, the search system server may de-prioritize results associated with a user who has recently transferred out of the current user's department, or rank results that have been selected by the current user's manager within the past three days higher relative to other results.

The search system server can rank results based on the location of the user submitting the search query. In some implementations, the search system server can look at the location of the user submitting the query with respect to other users within an enterprise. For example, the search system server may prioritize results being presented to nearby users or results that are commonly selected within the department of the organization that the user is physically near.

In some implementations, the search system server can rank results based on an identity of a particular client device being used to submit the search query, a particular location from which the search query is being submitted, a particular department or portion of the enterprise from which the search query is being submitted, etc. For example, the search system server can rank results based on the pattern of search queries submitted by the particular client device submitting the current search query.

The search system server can return results from an entered search query and rank the results based on resource access data. Resource access data indicates resource access patterns of users within an organization or enterprise. For example, resource access data may include logs of user edits to a particular document, user accesses of a particular application, etc.

The search system server may rank search results based on whether the results were identified using data from a user cache. A user cache includes data identifying resources that a user has previously interacted with. User interactions with a resource, object, application, etc. includes editing, accessing, sharing, moving, etc. By considering whether a user has previously interacted with the resource being presented as a result, the search system server can present resources more likely to be relevant to the user.

The search system server may consider other factors when ranking results, including the user's identity, other users' identities, user input other than the submitted search query, etc. For example, the search system server may rank resources returned as search results based on whether other users within the current user's organization often access similar resources.

The search system server can rank search results based on the present of certain types of content or data structures present within the particular search result resource. In some implementations, a user may select a particular type of content or data structure as a filter for the search results. In some implementations, particular types of content or data structures contained within a search result are automatically prioritized based on the current user's identity, including the user's search history, department, location, etc. For example, if the user often selects results containing line graphs, the search system server can determine whether a search result includes a data visualization object, such as a graph or a chart and rank the search result according to the determination.

In some implementations, signals providing data and user preferences extracted from the user's cache may be allocated a higher ranking or weight relative to signals providing data that is not extracted from the user's cache. For instance, the search server signal may allocate a higher weight or ranking to a signal identifying, based on the user's cache data, a resource that was previously visited by the user relative to a signal identifying a resource having the highest query frequency amongst a social network of the user or a user group of which the user is a member of.

The search system server may determine a cumulative score of each resource based on the criteria and the weights assigned to the one or more received signals. The search results may be ranked and displayed according to the determined scores of each resource.

The search system server can perform two separate types of ranking of the search results returned for a particular search query. The search results may be presented in a user interface organized as a list in which results are organized into categories, as shown in portion 350. The categories are ranked in order of which category of results the user is most likely to find relevant. Within each category, the results from the category are also ranked. In some implementations, a limited number of results are shown for each. For example, the search system server may display the top three ranked search results within each category. In some implementations, the number of search results shown within a category is determined dynamically based on the number of search results returned in general. For example, if fifteen search results are found in the reports category, two search results are found for the maps category, and no other results are found, the search system server may display the top five results in the reports category and both of the results in the maps category. As another example, even if the overall numbers of results in each category are greater than three, the relevance and prioritization determined using document access data can be used to adjust the relative numbers of results shown. For example, if results in a particular category are much more relevant than results of other categories, or if users in the cluster that the searching user is assigned to favor results from the particular category, than the particular category may be given a larger portion of the search result area and/or a higher ranking relative to other categories.

Referring to the exemplary implementation shown in FIGS. 3 and 3A, the search results may be displayed in a drop down interface 350. In some implementations, one of portions 320 and 330 may be used to display the search results. The displayed search results may include one or more of suggestions, links, and graphical and alphanumeric identifiers of resources within the unified, multi-platform enterprise system and the categories within which the resources are located. For instance, in response to the query "Te," "Terry Green," "Ted Lee," "Aqueduct Test," "Technology Trends," "Executive Team," "Sales opportunities created last month," "Sales opportunities created last year," and "Technology employee headcount" resource identifiers are displayed within their respective categories, i.e., "Users," "Environments," "Applications," "Dossiers," and "Reports." In some implementations, the system provides a predetermined number or range of results. For example, the system may provide the top one, two, or three results for each category that is indicated.

In some implementations, the search system server can display categories in a predetermined order. This provides predictability, and allows users to become familiar with a particular organization of the search results for faster navigation of the user interface.

The search system server ranks the set of search results within each category as well. The search system server may rank the search results based on various factors including the relevance of the search result, user resource access data, etc. For example, the search system server may rank a user David higher than a user Adam, because David is in the current user's department within the enterprise, and Adam is not.

When ranking resources or objects identified as search results, the search system server can consider input received through the GUI outside the search functionality of the GUI. For example, the state of the GUI prior to the initiation of a search can signal a user's interests. The search system server may determine that a user's selection through the GUI is likely to be of current interest to the user at the time they are submitting a query, and may rank results based on determining whether the search results are associated with the user's GUI input. For example, the search system server may determine that the user has selected a category of documents in portion 310, where the selection occurs either before or after entering a search term. The selection outside the search functionality of the GUI can be indicated to the search server system, which can boost the ranking resources or objects that belong to the category selected by the user. The search system server can consider other input received through the GUI, including a selected user group, a selected user, a sort order of the objects presented within the GUI, etc. The search system server can consider multiple selections and inputs. For example, if a user has highlighted three ungrouped users in the portion 330, and a particular user group in the portion 320, the search system server may consider all four selections when ranking search results.

In the exemplary implementation shown in FIG. 3, the "Users" category has been selected in portion 310 of the GUI. Consequently, the "Users" category has been allocated the heaviest weight and the resources identified within the "Users" category have been displayed with the highest ranking. The remaining results have been displayed and ranked based on the respective cumulative scores of each resource.

In some implementations, the search system server can use the input received through the GUI as a search query or as a filter. For example, the search system server can use a selected user group from the portion 320 as a filter for search results, or a selected user as the search query.

After displaying the results, the search system server determines whether the user has selected a displayed search result (245). If no selection has been received, the search system server may continue to display the search results (240) or update the search query in response to one or more additional characters being received in the search input window (220). If one or more additional characters are received in the search input window, operations 225, 230, 235, 240, and 245 may be repeated.

If the user selects one of the displayed search results, the search system server may update the user cache and session data to reflect the user selection, and may provide data associated with the selected search result in the GUI 300 (250). For instance, in the exemplary implementation shown in FIGS. 3 and 3A, "Ted Lee," an indicator and suggestion of a resource associated with user Ted Lee, was selected by the user. In some implementations, in response to the selection, data associated with user Ted Lee may be displayed in one or more of portions 320 and 330. The data associated with user Ted Lee may include, but is not limited to, one or more of Ted Lee's contact information, occupation within the enterprise, resources accessed, created, modified, or viewed by user Ted Lee, and content or metadata of resources that include the name of Ted Lee.

In some implementations, the order of the categories of results is ranked based on various factors, including GUI context or user input through the GUI, the set of search results within a category, etc. For example, the order of categories of results may be set based on whether the current user has selected a particular category in the portion 310 before or after entering the search query. Additionally, or in the alternative, the search system server can rank categories of results based on the number of results within a particular category. For example, if the applications category includes five search results and the dossiers category only includes one search result, the applications category may be shown before the dossiers category. Additionally, or in the alternative, the search system server can rank categories based on the relevance of resources within a particular category. For example, if the resources within the applications category are of higher average relevance to the user's search query, the applications category and the search results belonging to the applications category may be displayed first.

Figure 4:
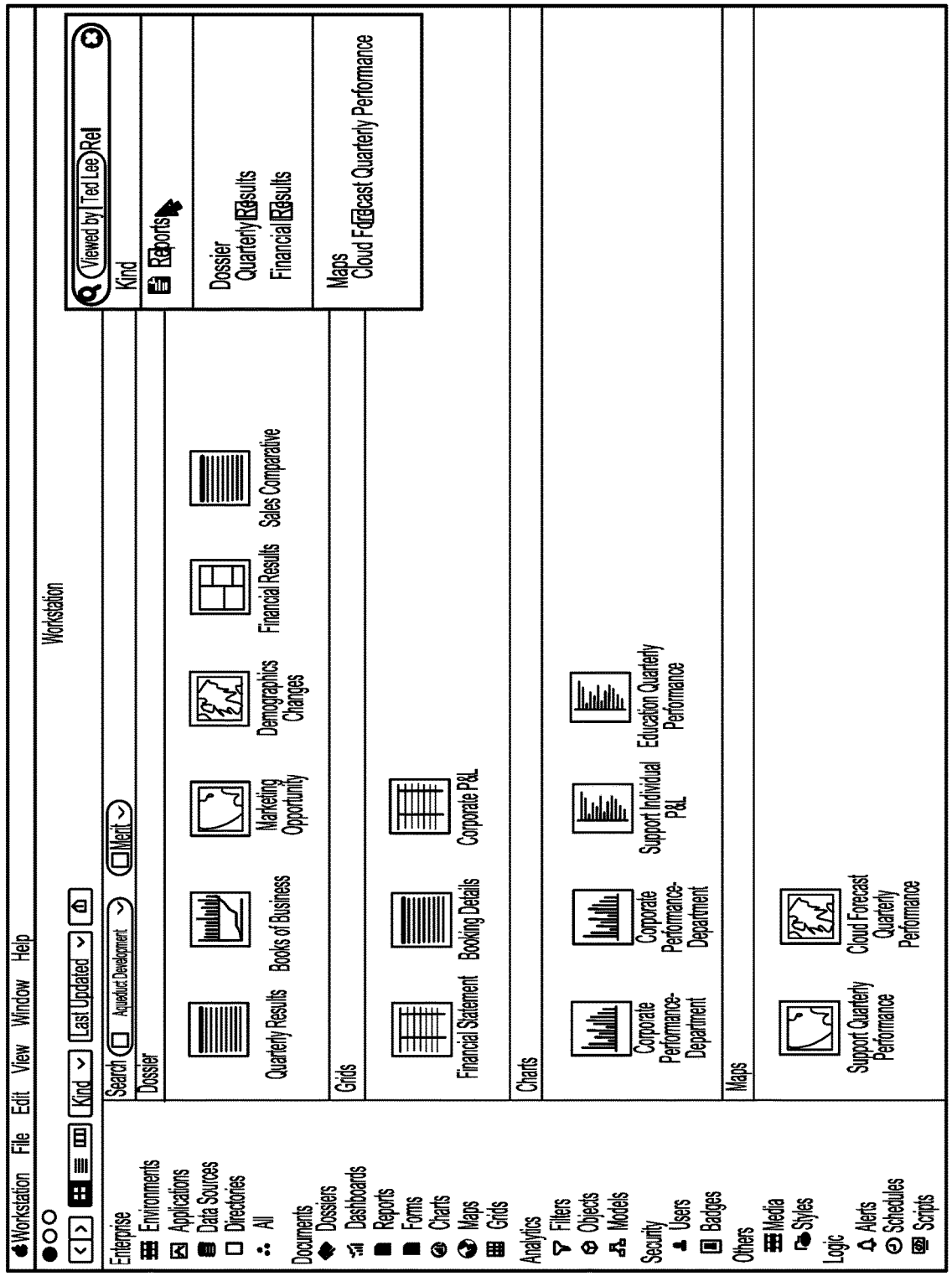
Figure 4A:
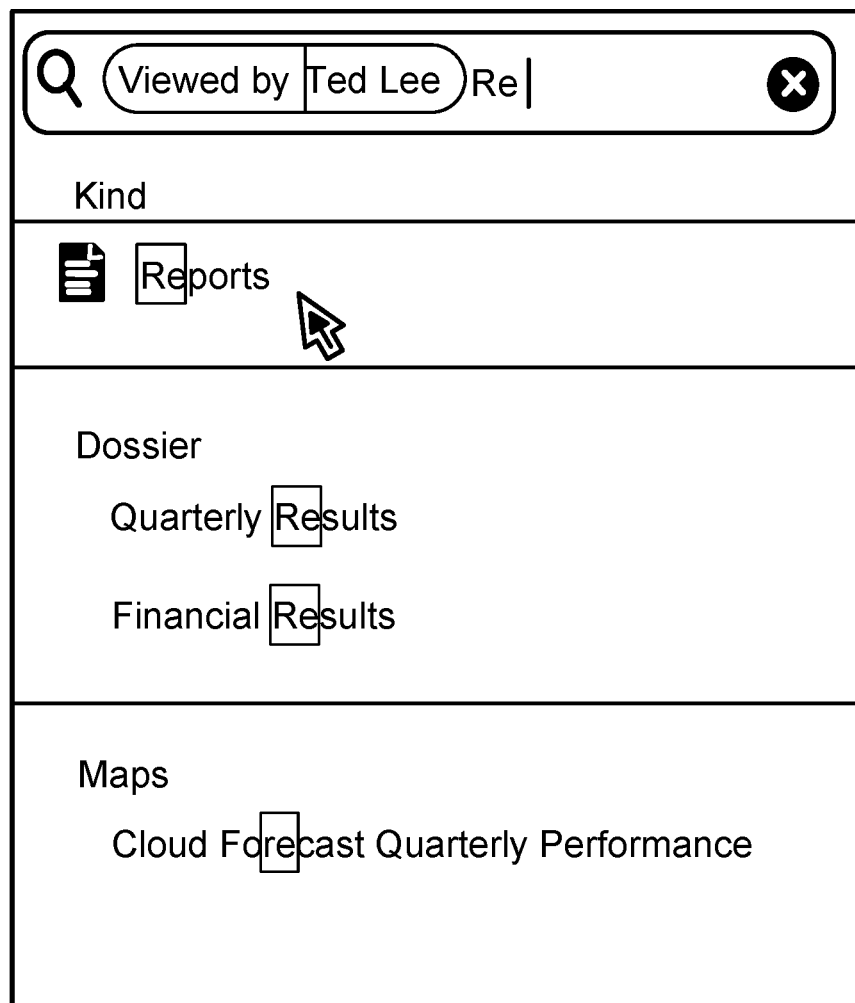

In some implementations, in response to the user selection, a selected resource may be may be added as a filter. For example, the user may select the user "Ted Lee," as shown in FIGS. 3 and 3A. The selection may be made, for example, by right-clicking a name or indicator of user "Ted Lee." A menu may be displayed in response to the right-click, and the user may select to add user "Ted Lee" as a filter for a subsequent search. The filter may specify one or more associations of the user "Ted Lee" with resources the user is searching for. For example, in some implementations, a user may select a filter such as "accessed by," "created by," "modified by," or "viewed by" the user. In the exemplary implementation illustrated in FIGS. 4 and 4A, a filter of "Viewed by Ted Lee" has been included in the search input window. When the user selects a suggestion or filter, the suggestion or filters may be included in the search input window and the previously entered characters "Te" are removed to allow new characters to be entered. In addition, any selected filters may be displayed in the search input window as a search limitation indicator. In some implementations, if no categories or sub-categories have been selected as filters or inputs, a search may be performed for data content according to the entered query characters in all categories in the unified, multi-platform enterprise system.

In some implementations, a user may select a search result presented in response to the user's search query and the user may choose to apply the selected search result as a filter. For example, the user may search for the "information technology" (IT) department of an enterprise. When this department is shown as a search result, the user may select the IT department result and apply it as a filter for further searching. For example, the user may interact with the result to cause a context menu or other set of options to be displayed. The context menu may allow the user to select from among multiple relationships to use in filtering based on the selected user or group. For example, the context menu may allow the user to select between filtering to objects viewed by members of the group, objects created by members of the group, objects edited by members of the group, and so on.

Once a user defines a filter based on a result, the application on the client device displays a visual indication that the filter is being applied. For example, the indication can specify the user or group used to define the filter, as well as the relationship that objects must have with that user or group. As an example, the selection of the IT group may result in an indication that results of further searching are filtered to those "viewed by: IT department."

With the filter applied, the application allows the user to enter additional search term. In some implementations, after a result is selected to define a filter, the prior query text is removed and a user can enter text of a new query into the same query input field. When a user enters text, the application provides the text to the search system server to request search results. The filter criteria can be indicated to the server, or can be applied by the client device to filter a set of results received by the server.

In some implementations, choosing a search result to apply as a filter results in different search results being presented, and a user can select a new set of search signals to apply. For example, once a user selects the "information technology" group as a filter, the results for the subsequent query "expense report template" may include a back-up of all expense reports, a specific template for IT expenditures, and various other IT related documents, as opposed to a general expense report template that would be highest ranked without the filter.

It should be understood that, in some implementations, the search results displayed in the drop down interface illustrated in FIGS. 3 and 3A are a result of the characters input in the search input window and certain other search classification signals (e.g., selected filters). The search results displayed in the drop down interface illustrated in FIGS. 3 and 3A are not necessarily dependent on the selections of categories or sub-categories displayed in portion 310.

After updating the user cache and session data and displaying data associated with a selected search result, the search system server may determine whether a subsequent search query or filter is received from the user through the user enterprise device (255). If no subsequent search query or filter is used, the method for handling and performing a universal search in the unified, multi-platform enterprise system ends (260).

If the user expands or refines the query, operations 225, 230, 235, 240, 245, and 250 may be repeated. For example, after selecting user "Ted Lee" in the exemplary implementation illustrated in FIGS. 3 and 3A, the user has specified a query limitation, e.g., a filter, that requires results to be items that were "viewed by Ted Lee." In this manner, selection of one of the search results can cause the search result to be defined as a filter for a subsequent search (e.g., the next search entered). In addition, the user specified the "Aqueduct Development" environment and "Merit" application as filters, as shown in the exemplary implementation of FIG. 4. These specify that search results should be objects from the specified computing environment, "Aqueduct Development." For example, the search results may be required to be documents served or stored by the servers of the environment, users assigned to interact with the servers in the environments, or other objects linked to or accessible within the environment. Additionally, search results are required to be linked to the Merit application, e.g., reports or other items generated using the application. The user may also input characters "Re" to continue a search for a particular resource in the unified, multi-platform enterprise system. In the subsequent search, the search system server may provide search results that include the characters "Re" after applying filters or limitations requiring results to have been "viewed by Ted Lee," and to be accessible within the "Aqueduct Development" environment and be associated with the "Merit" application that is hosted in the environment.

In some implementations, a method includes: providing a user interface that includes a search query input field; providing first search results for display, the first search results being identified using first text entered into the search query input field; receiving data indicating a user selection of one of the first search results; based on the user selection, defining one or more filter criteria based on the selected first search result; and after defining the filter based on the selected first search result, providing second search results for display, the second search results being identified using second text entered into the search query field after defining the filter, where each of the second search results satisfies the one or more filter criteria.

In some implementations, the first text is removed from the search query input field in response to selection of one of the first search result to define a filter based on the selected search result. The application can allow each search result to be interacted with in any of multiple different ways. For example, one type of interaction may cause a search result to be selected for display, while a different type of interaction may cause the system to define a filter based on the search result. Search results can be provided in a drop-down list below the search query input field, and user selections to define filters can be made from the positions of the items in the lists.

In some implementations, the application provides a visual indicator of the filter that is defined. The indicator can include a representation of the selected search result used to define the query. For example, the indicator can show a user name or an icon of the user's face. The indicator can indicate a relationship that filtered search results have with the selected search result. For example, the indicator can indicate that filtered results were viewed by, created by, edited by, shared by, annotated by, rated by, or otherwise accessed by a user who corresponds to a selected search result. The indicator of the filter can be placed in or adjacent to the search query input field.

The list of search results can include search results from multiple different object types or document types. For example, results may come from categories for applications, documents, user identities, and other types of data. Some or all of these different types of objects may be used to define filters. For example, a filter defined based on a user may limit results to items that the user accessed. A filter defined based on an application may limit results to items that the application created or opened. A filter defined based on a document may limit results to items that interacted with the document over a particular time frame, e.g., within the previous week, month, or year.

When a user indicates that a search result should define a filter, the application may provide a context menu or set of selectable options to specify the relationship that filtered documents should have with the item represented by the selected search result. For example, if a search result representing a user is selected, the application can provide options to limit results to those that are (i) viewed by the selected user, (ii) created by the selected user, or (iii) edited by the selected user. Similar options to specify relationships for defining a filter can be provided for selections of results corresponding to applications, documents, and results from other categories.

Multiple filters can be sequentially defined based on selections from different sets of search results. For example, a first filter may be defined based on selection of a result for a first query. Results to a second query, which are filtered based on the first filter, can then be displayed, and the system allows the user to select one of the results to the second query to define as a second filter. When a third query is entered in the search query input field, the application may cause a set of results filtered by both the first filter and the second filter to be displayed.

The method described above with reference to FIGS. 2-4A may provide several advantages. For example, to locate a resource, a user does not need to know which category the data is classified under within the enterprise. Rather, the system provides an indication of one or more categories that include a particular resource the user is searching for. In some implementations, the user may search across various platforms in an enterprise using a single graphical user interface. In some implementations, a more efficient method of searching enterprise resources is disclosed by applying a character threshold for search queries. In some implementations, the search system searches metadata associated with resources and is not limited to searching resource identifiers and content within resources. In some implementations, by using one or more search signals and a display criterion, search results that are likely to be more relevant to a user are provided for display and user selection.

The search system and method described above may also include additional search tools. For example, in some implementations, an auto complete tool may be implemented by the search system server such that suggestions for query terms and phrases may be provided for the user to select from based on the one or more characters input in the search input window. In some implementations, a portion of the search results provided to the user may be generated by the auto completed tool. In some implementations, the search is not limited to resources in the unified, multi-platform enterprise system, and may be extended to resources available in the Internet. Search results displayed in the GUI 300 may include an indicator indicating whether the resource identified by the search result is available in one or more of the unified, multi-platform enterprise system and the Internet.

Figure 5:
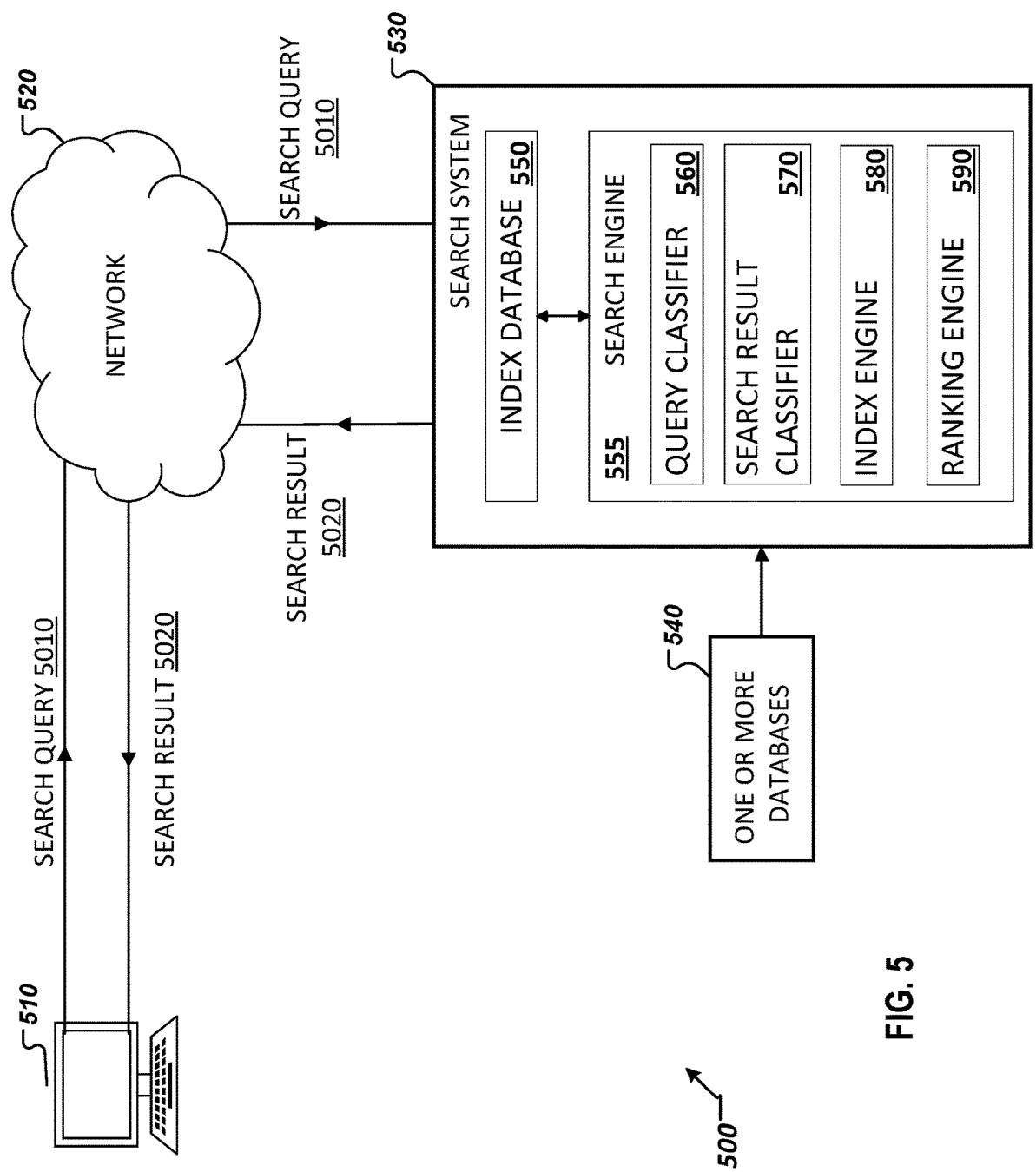
FIG. 5 is an illustration of a system for handling and performing a universal search.

A system for implementing the method described above is illustrated in FIG. 5. Referring to FIG. 5, a user may access a search system 530 via network 520 using an enterprise device 510. The search system 530 may also be connected to one or more databases 540. In some implementations, the one or more databases 540 may be integrated with the search system 530.

Enterprise device 510 may be any suitable electronic device such as a personal computer, a mobile telephone, an electronic pad, a smart phone, a smart watch, a smart TV, smart glasses, a mobile audio or video player, a game console, or a combination of one or more of these devices. In general, the enterprise device 510 may be a wired or wireless device capable of browsing a network and providing a user with search results.

The enterprise device 510 may include various components such as a memory, a processor, a display, and input/output units. The input/output units may include, for example, a transceiver which can communicate with network 520 to send one or more search queries 5010 and receive one or more search results 5020. The display may be any suitable display including, for example, liquid crystal displays, light emitting diode displays. The display may display search results 5020 received from the search system 530.

The network 520 may include one or more networks that provide network access, data transport, and other services between a unified, multi-platform enterprise system and enterprise device 510. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (Wi-Fi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

In some implementations, the one or more networks may also include private networks, restricted networks, one or more enterprise networks and systems.

In some implementations, the one or more networks may include one or more of databases, access points, servers, storage systems, cloud systems, and modules. For instance, the one or more networks may include at least one server, which may include any suitable computing device coupled to the one or more networks, including but not limited to a personal computer, a server computer, a series of server computers, a mini computer, and a mainframe computer, or combinations thereof. The at least one server may be a web server (or a series of servers) running a network operating system, examples of which may include but are not limited to Microsoft® Windows® Server, Novell® NetWare®, or Linux®. The at least one server may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, data may be sent and received using any technique for sending and receiving information including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

The one or more databases 540 may include various types of database, including a cloud database or a database managed by a database management system (DBMS). A DBMS may be implemented as an engine that controls organization, storage, management, and retrieval of data in a database. DBMSs may provide the ability to query, backup and replicate, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the one or more databases 540 may include one or more cache databases. The cache databases may store data indicative of the Internet browsing activity, a history of user search entries and results, and other related search session data such as a metadata, and time and location information associated with search entries or search results. In some implementations, the cache database may cache data indicative of previous queries submitted in the same search session as a currently received query and data associated with previous web links clicked on by a user of the enterprise device 510 in the same session. The cached data may be used to determine a likely topic of interest for a search session. The likely topic of interest may include a search result that the user may likely be interested to access in response to entering a part or a complete search query in the search field. Data corresponding to the likely topic of interest may include one or more of a name, graphical representation, alphanumeric representation; an indicator of a resource; various types of data content; and a link to information that can be retrieved upon selection by a user.

In some implementations, based on the user's cache, a processor coupled to the one or more databases 540 may determine the likely topic of interest for a current search session. The processor may generate and transmit one or more classification signals including data indicative of the likely topic of interest to the search system 530.

In some implementations, the search system server searches for and ranks results based on the user's current location. The search system server can automatically rank results based on whether the current user is alone or based on the identity of users in proximity to the current user. For example, if the current user is in a meeting, the user's client device may detect the presence of devices corresponding to other users using a wireless communication link such as BLUETOOTH. The user's client device can provide identifiers for the other device detected, and the interests and document access patterns of the users located nearby may be used to adjust the rank of documents presented to the user. As a result, if others in the same room as the user are viewing or presenting a document, the search system server may determine that the particular search result is currently popular among users near the current user. As a result, the search system may boost the rank of that document.

In some implementations, users are able to sort results by applying filters and narrowing results to particular regions, departments, users, etc. In some implementations, users are able to control whether the search system server automatically uses proximity data to rank search results. For example, if the current user is in a teleconference room and a user in the office next to the conference room often searches for irrelevant items, the current user may temporarily disable, reduce the importance of, or turn off entirely, the proximity searching and ranking feature.

The search system server can rank search results based on relevance of the results. For example, the search system server can identify results to a submitted query, determine whether results are relevant to the query, and dismiss irrelevant results. The search system server can determine whether search results are relevant based on various factors, including whether characters entered as the query match characters associated with or contained in the resource identified, the type of resource that is identified, the department associated with the resource, etc.

The search system 530 can be implemented, at least in part, using, for example, computer script running on one or more servers in one or more locations that are coupled to each other through network 520. The search system 530 includes an index database 550 and a search engine 555, which includes a search query classifier 560, a search result classifier 570, an index engine 580, and a ranking engine 590.

The index database 550 stores indexed resources found in the repository of the unified, multi-platform enterprise system. The resources, as described above, may include, for example, documents such as web pages, images, or news articles that are available across various platforms in an enterprise. In some implementations, the resources may include resources on the Internet. While one index database 550 is shown, in some implementations, multiple index databases can be built and used.

The index engine 580 indexes resources in the index database 550 using various suitable tools, software, and techniques. For example, in some implementations, the indexing may be performed using Apache Lucene. The index engine 580 may receive information about the contents of resources, e. g., tokens appearing in the resources that are received from a web crawler, and may index the resources by storing index information in the index database 550. In some implementations, the index engine 580 also indexes metadata of the resources.

The search engine 555 uses the index database 550 to identify resources that match a search query 5010 to generate, for example, a set of search results. The ranking engine 590 ranks resources that match the search query 5010. The ranking engine 590 may rank the resources using various suitable techniques and criteria. For example, in some cases, the ranking engine may rank resources based on the relevancy of the resources or metadata of the resources to terms in the search query 5010. The ranking engine 590 may also modify the rankings of search results in the set of search results based on one or more received search signals, as described above, and provide the modified rankings for use in the presentation of the set of search results.

The search query classifier 560 may include one or more classifiers. As described above, the search query classifier 560 may compare the characters in an input search query to a character threshold to determine if the character threshold is satisfied. If the threshold is satisfied, the search query classifier 560 may generate a signal for the search engine 555 to provide search results.

The search result classifier 570 classifies search results included in the set of search results provided by the index database 550. One or more classifiers and methods of classification may be used to classify search results included in the set of candidate search results provided by the index database 550. For instance, the search result classifier 570 may include particular subject matter classifiers and may execute various methods such as image classification methods and keyword matching methods to classify resources associated with search results. The search result classifier 570 may determine the likely subject matter included in a search result resource and use a subject matter threshold to classify the search result resource. The subject matter threshold may vary for different subject matters.

In some implementations, the search engine 555 may receive search classification signals from the search query classifier 560 and the search result classifier 570. In some implementations, the search engine 555 may receive search classification signals from the search query classifier 560, the search result classifier 570, and one or more databases 540. Based on the search classification signals, the search engine 555 may select search results from the set of search results to be included in the set of search results to be sent to the enterprise device 510. The selection by the search engine 555 may include removing, selecting, or changing a ranking of a search result in the set of candidate search results as described above.

The search engine 555 transmits one or more search results 5020 through the network 520 to the enterprise device 510. The search results 5020 transmitted to the enterprise device 510 include the presentation set of search results. It should be understood that the search results 5020 transmitted to the enterprise device 10 may include various types of information associated with each search result. For instance, the information associated with each search result may include one or more of an identification of a resource, a link to the resource, a description of the resource, a preview of the resource, a title of the resource, and an image associated with the resource. In some implementations, the search results 5020 may also include suggestions for related search queries, related images, advertisements, or information that may be of interest to the user.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on one or more computers having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method performed by one or more computers, the method comprising:
receiving, by the one or more computers, a first search query input comprising query text entered to a query input field of a user interface;

providing, by the one or more computers, a first set of one or more search results identified based on the search query input;

receiving, by the one or more computers, data indicating interaction of the user with a particular search result from the one or more search results;

in response to receiving the data indicating the interaction of the user with the particular search result:
  determining, by the one or more computers, a filter based on the particular search result interacted with by the user, wherein the filter provides a constraint for selecting search results; and
  setting, by the one or more computers, the filter to be applied for a subsequent query such that the filter provides the constraint in addition to query text of the subsequent query; and after setting the filter to be applied, providing, by the one or more computers, a second set of one or more search results in response to a second search query input to the query input field of the user interface, the second set of one or more search results being selected based on (i) query text in the query input field after the second search query input and (ii) the constraint of the filter determined based on the interaction of the user with the particular search result.

2. The method of claim 1, wherein the interaction is a selection of the particular search result from among the one or more search results.

3. The method of claim 1, wherein the search query input is a partial search query.

4. The method of claim 1, wherein applying the filter comprises:
  after receiving the data indicating the selection by the user, receiving data indicating a second search query input; and
  providing, in response to the second search query input, one or more second search results that (i) are identified based on the second search query input and (ii) each satisfy one or more constraints of the filter.

5. The method of claim 1, comprising, after receiving the data indicating the interaction of the user with the particular search result, providing an indication that the filter is being applied.

6. The method of claim 1, comprising:
  providing a search control on a user interface; and
  after receiving the data indicating the interaction of the user with the particular search result, providing an indication that the filter is being applied on the search control on the user interface.

7. The method of claim 6, wherein indicator indicates a restriction imposed by the filter.

8. The method of claim 1, comprising, in response to receiving the data indicating the interaction with the particular search result, displaying an interactive user interface element having a selectable option to enable the filter.

9. The method of claim 8, comprising:
  receiving data indicating an interaction with the interactive user interface element; and
  in response to receiving the data indicating the interaction with the interactive user interface element:
    removing the search query input from a search query input field of a user interface; and
    enabling the filter for processing subsequent query inputs to the search query input field.

10. The method of claim 1, comprising:
in response to receiving the data indicating the interaction with the particular search result, displaying one or more interactive user interface elements indicating multiple filters that each provide different constraints; and
receiving data indicating a selection of a filter from among the multiple filters;
wherein applying the filter comprises applying the selected filter.

11. The method of claim 10, wherein each of the multiple filters is related to the particular search result.

12. The method of claim 1, comprising, after interaction of the user with the particular search result, removing the search query input from the search query input field before input of the subsequent search query input.

13. The method of claim 1, wherein providing the one or more search results identified based on the search query input comprises displaying, in a drop-down list, the one or more search results; and
  wherein receiving the data indicating interaction of the user with the particular search result comprises receiving data indicating a selection of the particular search result from the drop-down list.

14. The method of claim 1, wherein the one or more search results comprise at least one search result from each of multiple different categories of search results.

15. The method of claim 14, wherein the categories of search results include at least two categories from the group consisting of documents, applications, maps, computer environments, and people.

16. The method of claim 14, wherein the search results from the multiple different categories are organized into groups according to the categories and are presented with labels identifying the categories.

17. The method of claim 1, wherein the particular search result is associated with a user, wherein the filter limits search results to items associated with the user.

18. The method of claim 17, wherein the filter limits search results to items that have been at least one of created by the user, viewed by the user, edited by the user, shared by the user, annotated by the user, or rated by the user.

19. One or more non-transitory computer-readable media storing instructions that, when executed by one or more computers, cause the one or more computers to perform operations comprising:
  receiving, by the one or more computers, a first search query input comprising query text entered to a query input field of a user interface;
  providing, by the one or more computers, a first set of one or more search results identified based on the search query input;
  receiving, by the one or more computers, data indicating interaction of the user with a particular search result from the one or more search results;
  in response to receiving the data indicating the interaction of the user with the particular search result:
    determining, by the one or more computers, a filter based on the particular search result interacted with by the user, wherein the filter provides a constraint for selecting search results; and
    setting, by the one or more computers, the filter to be applied for a subsequent query such that the filter provides the constraint in addition to query text of the subsequent query; and
  after setting the filter to be applied, providing, by the one or more computers, a second set of one or more search results in response to a second search query input to the query input field of the user interface, the second set of one or more search results being selected based on (i) query text in the query input field after the second search query input and (ii) the constraint of the filter determined based on the interaction of the user with the particular search result.

20. A system comprising:

one or more computers; and one or more computer-readable media storing instructions that, when executed by the one or more computers, cause the one or more computers to perform operations comprising:

receiving, by the one or more computers, a first search query input comprising query text entered to a query input field of a user interface;

providing, by the one or more computers, a first set of one or more search results identified based on the search query input;

receiving, by the one or more computers, data indicating interaction of the user with a particular search result from the one or more search results;

in response to receiving the data indicating the interaction of the user with the particular search result:

determining, by the one or more computers, a filter based on the particular search result interacted with by the user, wherein the filter provides a constraint for selecting search results; and setting, by the one or more computers, the filter to be applied for a subsequent query such that the filter provides the constraint in addition to query text of the subsequent query; and after setting the filter to be applied, providing, by the one or more computers, a second set of one or more search results in response to a second search query input to the query input field of the user interface, the second set of one or more search results being selected based on (i) query text in the query input field after the second search query input and (ii) the constraint of the filter determined based on the interaction of the user with the particular search result.

* * * * *